United States Patent
Liu et al.

(10) Patent No.: US 12,315,218 B2
(45) Date of Patent: May 27, 2025

(54) SYSTEMS AND METHODS FOR TRACKING GROUPS OF OBJECTS IN MEDICAL IMAGES

(71) Applicant: Shanghai United Imaging Intelligence Co., Ltd., Shanghai (CN)

(72) Inventors: Yikang Liu, Cambridge, MA (US);
Luojie Huang, Baltimore, MD (US);
Zhang Chen, Cambridge, MA (US);
Xiao Chen, Cambridge, MA (US);
Shanhui Sun, Cambridge, MA (US)

(73) Assignee: Shanghai United Imaging Intelligence Co., Ltd., Shanghai (CN)

( * ) Notice: Subject to any disclaimer, the term of this patent is extended or adjusted under 35 U.S.C. 154(b) by 348 days.

(21) Appl. No.: 17/858,663

(22) Filed: Jul. 6, 2022

(65) Prior Publication Data
US 2024/0013510 A1   Jan. 11, 2024

(51) Int. Cl.
*G06V 10/75* (2022.01)
*G06N 3/045* (2023.01)
(Continued)

(52) U.S. Cl.
CPC .......... *G06V 10/751* (2022.01); *G06N 3/045* (2023.01); *G06N 3/08* (2013.01); *G06T 7/73* (2017.01);
(Continued)

(58) Field of Classification Search
CPC . G06T 7/73; G06T 7/248; G06T 2207/30021; G06T 2207/30004;
(Continued)

(56) References Cited

U.S. PATENT DOCUMENTS 7,912,278 B2 *   3/2011   Fung .................... G06T 7/0012
                                                                   382/224
9,265,468 B2     2/2016   Rai et al.
(Continued)

FOREIGN PATENT DOCUMENTS

CN          107851318 A       3/2018

OTHER PUBLICATIONS

Vernikouskaya, I., Bertsche, D., Dahme, T. et al. Cryo-balloon catheter localization in X-Ray fluoroscopy using U-net. Int J Cars 16, 1255â1262 (2021). https://doi.org/10.1007/s11548-021-02366-5 (Year: 2021).*

(Continued)

*Primary Examiner* — Chan S Park
*Assistant Examiner* — Paulo Andres Garcia
(74) *Attorney, Agent, or Firm* — Zhong Law, LLC (57) ABSTRACT

Described herein are systems, methods, and instrumentalities associated with tracking groups of small objects in medical images. The tracking may be accomplished by, for each one of a sequence of medical images, determining a plurality of candidate objects captured in the medical image, grouping the plurality of candidate objects into a plurality of groups of candidate objects and dividing the medical image into a plurality of regions that each surrounds a corresponding group of candidate objects. Each of the plurality of (Continued)

regions may be examined to extract respective features associated with each corresponding group of candidate objects. A match between a first group of candidate objects in a first medical image and a second group of candidate objects in a second medical image may be determined based on first features associated with the first group and second features associated with the second group.

16 Claims, 7 Drawing Sheets

(51) Int. Cl.
*G06N 3/08* (2023.01)
*G06T 7/73* (2017.01)
*G06V 10/764* (2022.01)

(52) U.S. Cl.
CPC .. *G06V 10/764* (2022.01); *G06T 2207/20081* (2013.01); *G06T 2207/20084* (2013.01)

(58) Field of Classification Search
CPC . G06T 2207/30204; G06T 2207/30208; G06T 2207/20081; G06T 2207/20084; G06V 40/167; G06V 10/751; G06V 10/764; G06V 10/426; G06V 10/762; G06V 10/82; G06V 2201/03; G06N 3/045; G06N 3/08
See application file for complete search history.

(56) References Cited

U.S. PATENT DOCUMENTS

| | | | | |
|---|---|---|---|---|
| 10,297,027 | B2* | 5/2019 | Scutaru | G06V 10/85 |
| 10,628,961 | B2 | 4/2020 | Sundaresan et al. | |
| 11,436,724 | B2* | 9/2022 | Palma | G06T 7/0012 |
| 11,842,485 | B2* | 12/2023 | Tan | G06T 7/0012 |
| 2011/0135176 | A1* | 6/2011 | Lendl | G06T 7/246 |
| | | | | 382/130 |
| 2016/0196666 | A1 | 7/2016 | Venkatraghavan et al. | |
| 2018/0165548 | A1* | 6/2018 | Wang | G06F 18/214 |
| 2019/0156204 | A1* | 5/2019 | Bresch | G06N 3/08 |
| 2021/0233240 | A1* | 7/2021 | Yan | A61B 6/032 |
| 2023/0298736 | A1* | 9/2023 | Cimen | A61B 6/545 |
| | | | | 382/128 |

OTHER PUBLICATIONS

Y. Lu, Y. Chen, D. Zhao, B. Liu, Z. Lai and J. Chen, "CNN-G: Convolutional Neural Network Combined With Graph for Image Segmentation With Theoretical Analysis," in IEEE Transactions on Cognitive and Developmental Systems, vol. 13, No. 3, pp. 631-644, Sep. 2021, doi: 10.1109/TCDS.2020.2998497. (Year: 2020).*
L. Zhang, V. Singh, G. -J. Qi and T. Chen, "Cascade Attention Machine for Occluded Landmark Detection in 2D X-Ray Angiography," 2019 IEEE Winter Conference on Applications of Computer Vision (WACV), Waikoloa, HI, USA, 2019, pp. 91-100, doi: 10.1109/WACV.2019.00017. (Year: 2019).*
Wang, S., Xu, Z., Yan, C., Huang, J. (2019). Graph Convolutional Nets for Tool Presence Detection in Surgical Videos. In: Chung, A., Gee, J., Yushkevich, P., Bao, S. (eds) Information Processing in Medical Imaging. IPMI 2019. Lecture Notes in Computer Science( ), vol. 11492. (Year: 2019).*
H. Xia, Y. Wang, X. Wang, S. Xiong and Z. Yu, "HKE-GCN: Heatmaps-guided Keypoints Encoder and Graph Convolutional Network for Human Pose Estimation," 2022 International Joint Conference on Neural Networks (IJCNN), Padua, Italy, 2022, pp. 1-8, doi: 10.1109/IJCNN55064.2022.9892251. (Year: 2022).*
Zhao, Z., Cai, T., Chang, F. and Cheng, X. (2019), Real-time surgical instrument detection in robot-assisted surgery using a convolutional neural network cascade. Healthc. Technol. Lett., 6: 275-279. https://doi.org/10.1049/htl.2019.0064 (Year: 2019).*

* cited by examiner

SYSTEMS AND METHODS FOR TRACKING GROUPS OF OBJECTS IN MEDICAL IMAGES

BACKGROUND

Small object detection can play an important role in the medical imaging field. Having the ability to ascertain and/or track the locations of certain small objects (e.g., implanted medical devices, surgical devices, etc.) based on sequentially-captured medical images of a patient's body may be crucial to the success of many medical applications or procedures including, for example, motion estimation, surgical navigation, device alignment, etc. Object detection techniques may analyze these medical images separately and independently and, therefore, lack the ability to determine and utilize any relationships between areas associated with these objects across the sequentially-captured medical images. Consequently, the results produced by these detection techniques may often be inconsistent across the different image frames and lack accuracy. Accordingly, systems, methods, instrumentalities are desired for improving the quality and efficiency of known object detection techniques.

SUMMARY

Described herein are systems, methods, and instrumentalities associated with tracking groups of objects (e.g., small objects) in medical images. An apparatus configured to perform the object detection task may include one or more processors configured to receive a plurality of medical images (e.g., a sequence of images of the same anatomical structure) and determine, using one or more artificial neural networks (ANNs), a plurality of candidate objects (e.g., a group of balloon markers associated with a stent placed inside the anatomical structure, a guide wire placed inside the anatomical structure, etc.) in each one of the sequence of medical images of the anatomical structure and determine a match between a first group of candidate objects in a first medical image and a second group of candidate objects in a second medical image, where the first medical image and the second image are related (e.g., captured sequentially over a small time delay). The plurality of candidate objects may be grouped into a plurality of groups of candidate objects and each medical image in the sequence may be divided into a plurality of regions that each surrounds a corresponding group of candidate objects. Respective features associated with each of the groups of candidate objects may then be extracted (e.g., from the corresponding regions). The match between the first group of candidate objects in the first medical image and the second group of candidate objects in the second medical image may then be determined based on first features associated with the first group of candidate objects and second features associated with the second group of candidate objects.

The one or more processors of the apparatus may be further configured to determine the plurality of candidate objects associated with a target object captured in the medical image, for each one of the sequence of medical images, by using a first neural network to calculate a heatmap of the medical image (e.g., each pixel in the heatmap is associated with a value that indicates a probability of the existence of a marker at the pixel) and then determining the plurality of candidate objects based on pixel values in the heatmap.

The one or more processors of the apparatus may be further configured to group the plurality of candidate objects into a plurality of groups of candidate objects (e.g., for each medical image in the sequence) by grouping the plurality of candidate objects into a plurality of pairs of candidate objects and to divide each medical image into a plurality of regions that each surrounds a corresponding group of candidate objects by dividing each medical image into a plurality of regions that each surrounds a corresponding pair of candidate objects.

The one or more processors of the apparatus may be further configured to extract respective features associated with each of the groups of candidate objects (e.g., for each medical image in the sequence) by calculating, using a second neural network, the respective features associated with each of the groups of candidate objects. The second neural network may include a plurality of layers that each performs a down sampling operation.

The one or more processors of the apparatus may be further configured to determine a graph representation of the plurality of groups of candidate objects, wherein the graph representation includes multiple nodes and multiple edges. Each of the nodes may represent a group of candidate objects and each of the edges may represent a relationship between a pair of the groups.

The one or more processors of the apparatus may be further configured to determine a match between a first group of candidate objects in a first medical image and a second group of candidate objects in a second medical image based on first features associated with the first group of candidate objects and second features associated with the second group of candidate objects by using a graph neural network (GNN). The GNN may receive, as inputs, a first graph representation associated with the first medical image and a second graph representation associated with the second medical image and calculate a node label indicating whether a group corresponding to the node comprises real objects. The GNN may then calculate an edge value for an edge connecting a first node of the first medical image and a second mode of the second medical image, where the edge value indicates whether the first node and the second node are associated with a same group of candidate objects. In examples, the output of the first neural network (e.g., heatmaps of the medical images) may be updated based on the output of the GNN (e.g., node labels and edge values).

In examples, the first neural network may be a first convolutional neural network (CNN) and the second neural network may be a second CNN, wherein the first CNN, the second CNN, and the GNN may be jointly trained. The training may include: calculating, from a training sequence of medical images, a heatmap regression loss based on output of the first CNN; calculating a marker group classification loss based on output of the second CNN; and calculating a node classification loss based on output of the GNN. At least one of the parameters associated with at least one of the first CNN, the second CNN, or the GNN may then be adjusted based on at least one of the heatmap regression loss, the marker group classification loss, or the node classification loss.

The one or more processors of the apparatus may be further configured to obtain a subsequent medical image after the sequence of medical images and calculate locations of a group of candidate objects in the subsequent medical image based on the locations of the group of candidate objects in the sequence of medical images.

BRIEF DESCRIPTION OF THE DRAWINGS

A more detailed understanding of the examples disclosed herein may be had from the following descriptions, given by way of example in conjunction with the accompanying drawings.

DETAILED DESCRIPTION

The present disclosure is illustrated by way of example, and not by way of limitation, in the figures of the accompanying drawings.

Figure 1A:
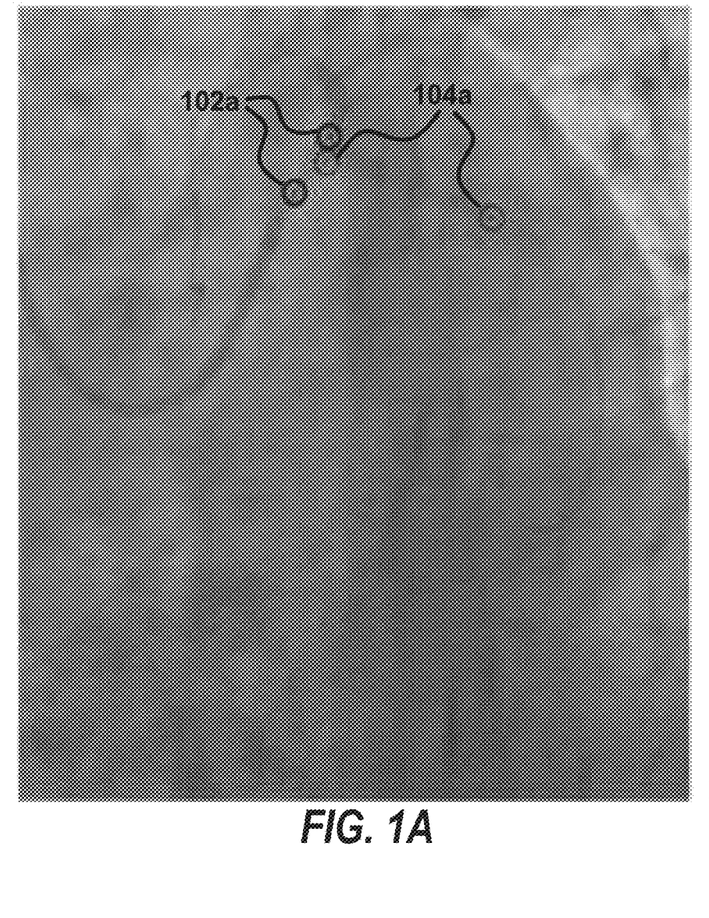
FIG. 1A and FIG. 1B are diagrams illustrating example groups of candidate objects (e.g., markers) that may be detected and tracked across multiple medical images using the techniques provided in accordance with one or more embodiments describe herein.
Figure 1B:
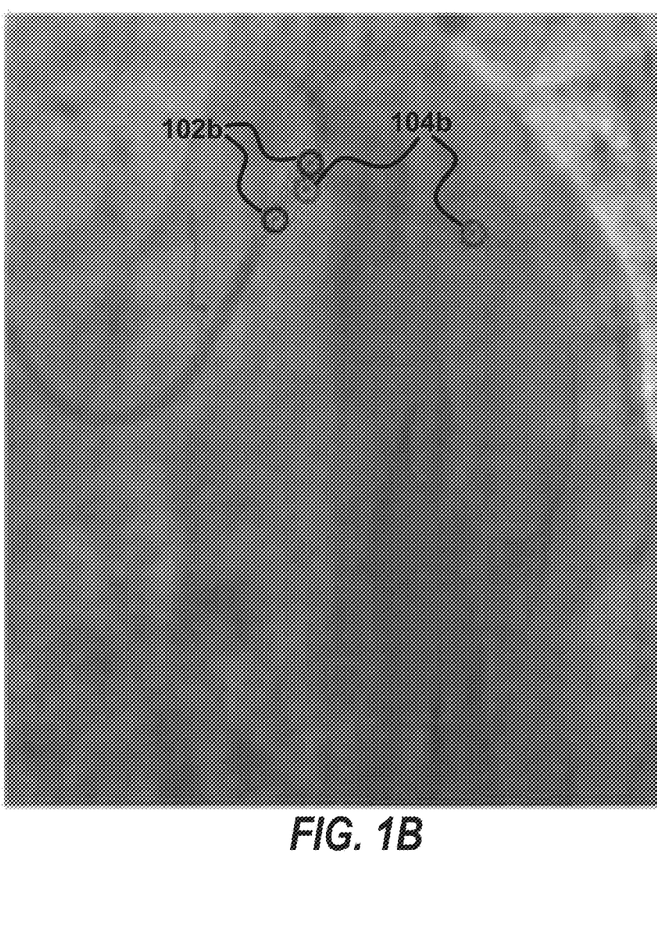

FIG. 1A and FIG. 1B are diagrams illustrating example groups of candidate objects (e.g., markers) including a first group (102a and 104a) and a second group (102b and 104b) respectively, that may be detected and tracked across multiple medical images using the techniques provided in accordance with one or more embodiments describe herein. FIG. 1A shows an example first medical image in a sequence of medical images and FIG. 1B shows an example second medical image in the sequence of medical images, where the first and second medical images may be captured sequentially. FIG. 1A shows two groups of candidate objects (e.g., group 102a enclosed in darker-colored circles and group 104a enclosed in lighter-colored circles) that may indicate the location of larger objects in a patient's body. For example, locations associated with the presence of stents may be indicated by each group of candidate markers (e.g., balloon markers) 102a and 104a. More specifically, each group (e.g., pair) of candidate markers 102a and 104a may respectively indicate the locations of two parts of a stent. FIG. 1B shows two groups of candidate objects (e.g., group 102b enclosed in darker-colored circles and group 104b enclosed in lighter-colored circles) that may be the same two groups tracked from the first medical image in the sequence (FIG. 1A) to the second (FIG. 1B). Due to noise associated with the medical image, some areas in the image may resemble the appearance of a stent and may be mistakenly identified as the stent by an image processing system or apparatus. This problem may be addressed by tracking groups of small objects (or other indicators) that may be candidate markers for indicating the locations of any stents. These candidate markers may maintain the same spatial and/or geometric characteristics from one medical image in the sequence to another. For example, the relative locations of the points along the guidewire, and/or the distance between two balloon markers may remain the same across multiple medical images in the sequence of medical images. As such, these spatial and/or geometric characteristics may be explored to improve the tracking of groups of candidate markers, thus achieving detection of real markers based on the candidate markers, for example, by identifying the candidate markers that maintain the characteristics as real markers and those that do not maintain the characteristics as false markers.

It should be noted here that while embodiments may be described in this disclosure using markers or stents as examples, those skilled in the art will appreciate that the disclosed techniques may be used to detect other small objects such as small medical devices or anatomical structures as well.

Figure 2:
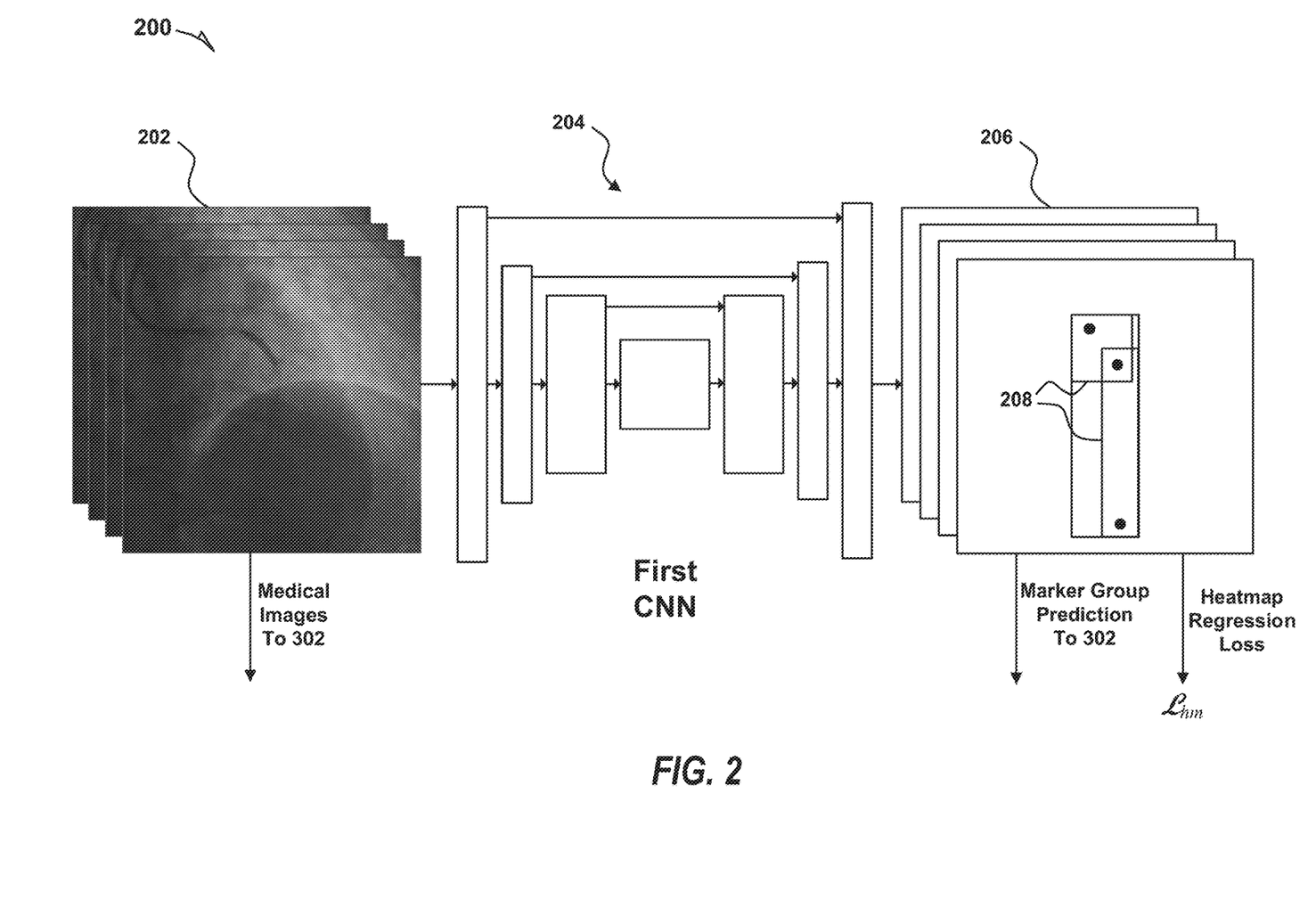
FIG. 2 is a simplified diagram illustrating example operations that may be performed to detect candidate objects (e.g., markers) in medical images and divide the images into regions surrounding groups of the candidate objects in accordance with one or more embodiments described herein.

FIG. 2 is a simplified diagram illustrating example operations 200 that may be performed to detect candidate markers in medical images 202 and divide the images into regions 208 surrounding groups of the candidate markers in accordance with one or more embodiments described herein. An apparatus configured to perform example operations 200 may include one or more processors configured to detect candidate markers in one or more medical images 202 (e.g., a sequence of medical images). The one or more medical images 202 may be scan images (e.g., MRI, X-ray, etc.) of an anatomical structure (e.g., a heart) of the human body, and the candidate markers may include various anatomical and/or artificial structures or components that may indicate other phenomenon, such as the ends of a guidewire or a pair of balloon markers that may indicate the location of a stent in the medical image. The candidate markers may be tracked across multiple different medical images (e.g., a sequence of multiple scan images of a cardiac cine movie). The candidate markers may be initially identified by detection operations 200 on a hypothetical basis. For example, detection operations 200 may identify hypothetical candidate markers (e.g., respective locations of the hypothetical candidate markers 102a and 104a as shown in FIG. 1A) in the sequence of medical images. Because there may be some similarity between a candidate marker and its surrounding areas in some of the medical images, the hypothetical candidate markers identified by detection operations 200 may include true positives (e.g., real markers) and/or false positives (e.g., background areas mistakenly identified as the candidate markers).

In examples, detection operations 200 may perform the candidate marker detection tasks using one or more classification neural networks. In examples, the classification neural networks may include a deep neural network such as a first convolutional neural network (CNN) 204 that has been trained to extract image features from each input medical image 202 and classify areas of the medical image as containing a candidate marker or not containing a candidate marker based on the extracted image features. A digital image (e.g., medical images 202) may be composed of picture elements, also known as pixels, each with an associated value serving as a numeric representation for its intensity or grey level. Therefore, a digital image may be processed as the numerical values of these pixels and in order to detect a certain image feature (e.g., for extraction), the processing may recognize patterns and/or regularities associated with the image feature in the numerical values. For example, image feature extraction may be based on the recognition of numerical patterns associated with image features such as shapes and/or edges in a digital image. In this example, a probability map may then be created to localize candidate markers for each medical image 202 by recognizing candidate marker boundaries based on the shape and/or edge image features extracted from each medical image 202.

The first CNN 204 may include multiple convolutional layers and/or one or more pooling layers. The convolutional layers may be followed by batch normalization and/or linear or non-linear activation (e.g., such as rectified linear unit or ReLU activation). Each of the convolutional layers may include one or more convolution kernels or filters with respective weights, the values of which may be learned through a training process so as to extract image features from each of the medical images 202. The image features extracted by the convolutional layers may be down-sampled through one or more pooling layers to obtain a representation of the image features, for example, in the form of one or more image feature maps. The first CNN 204 may further include one or more un-pooling layers and one or more transposed convolutional layers. Through the un-pooling layers, the first CNN 204 may up-sample the image features extracted from the input medical images 202 and further process the up-sampled image features through the one or more transposed convolutional layers (e.g., via deconvolution operations) to derive one or more up-scaled or dense image feature maps. The dense image feature maps may then be used to predict (e.g., hypothesize) the locations of candidate markers (e.g., groups 102a and 104a in FIG. 1A), for example, in respective heatmaps 206 corresponding to the input medical images 202, where the pixel values of the heatmaps 206 may represent probability values for the presence of candidate markers at the respective predicted (e.g., hypothetical) locations in the corresponding medical images 202. A heatmap regression loss $\mathcal{L}_{hm}$ for heatmaps 206 may be calculated and used in training the first CNN 204 or jointly training with other neural networks as explained more fully below with respect to FIG. 6.

In examples, the detection operations 200 may predict groupings of the candidate markers into groups of candidate markers and each medical image in the sequence may be divided (based on heatmaps 206) into regions 208 that each surrounds a corresponding (predicted) group of candidate markers. Information regarding the predicted groups of candidate markers and the corresponding regions 208 may be provided to a second CNN (e.g., CNN 302 of FIG. 3) so that respective group features associated with each of the groups of candidate markers may then be extracted from the corresponding regions 208, as explained more fully below with respect to FIG. 3. In examples, the detection operations 200 may group the candidate markers into a groups of candidate markers (e.g., for each medical image in the sequence) by grouping the candidate markers into pairs of candidate markers (e.g., group 102a of FIG. 1A) and to divide each medical image into regions that each surrounds a corresponding group of candidate markers by dividing each medical image into regions that each surrounds a corresponding pair of candidate markers (e.g., each of the regions 208).

Figure 3:
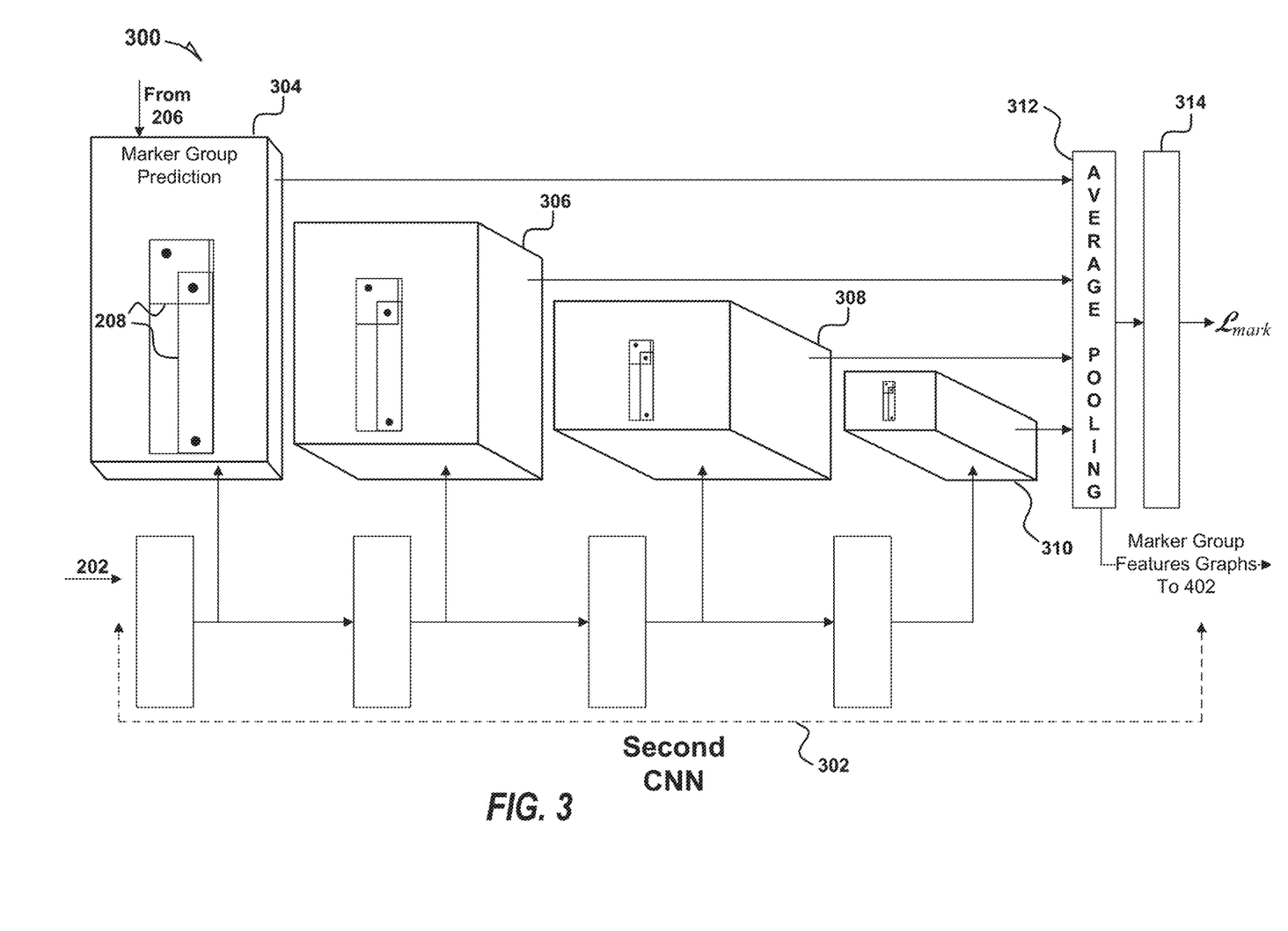
FIG. 3 is a simplified diagram illustrating example operations that may be performed for each of the regions to extract respective features associated with the corresponding group of candidate objects (e.g., markers) in accordance with one or more embodiments described herein.

FIG. 3 is a simplified diagram illustrating example operations 300 that may be performed for each of the regions 208 to extract respective group features associated with the corresponding group of candidate markers in accordance with one or more embodiments described herein. A group feature may be, for example, a feature extracted from a region 208 (e.g., a spatial feature such as a distance between candidate markers) that is shared by the candidate markers associated with the group of candidate markers corresponding to the region 208. For example, the pair of candidate markers of group 102a of FIG. 1A may both share the feature of being a same shape as each other and being within a corresponding region 208. An apparatus configured to perform example operations 300 may include one or more processors configured to extract group features, from each of the regions 208 in the one or more medical images 202, using a second CNN 302. The CNN 302 may receive the medical images 202 and the information regarding the predicted groups of candidate markers and the corresponding regions 208 (e.g., Marker Group Prediction) from 206 of detection operations 200 of FIG. 2, as described above. The extraction operations 300 may then determine respective groupings (e.g., groups 102a and 104a of FIG. 1A) of the candidate markers in the one or more medical images 202 based on the group features extracted by the second CNN 302 (e.g., at 304-310) and a marker group classification loss $\mathcal{L}_{mark}$ may then be calculated at 314 and used in training the second CNN 302 or jointly training with other neural networks as explained more fully below with respect to FIG. 6.

The second CNN 302 may include multiple convolutional layers, one or more pooling layers, and/or one or more fully connected layers. The convolutional layers of the second CNN 302 may include convolution kernels or filters configured to extract the group features of candidate markers in the regions 208 through one or more convolution operations. The convolution operations may be followed by batch normalization and/or non-linear activation, and the group features extracted by the convolutional layers (e.g., at 304-310) may be down-sampled through the one or more pooling layers (e.g. average pooling at 312) to obtain a representation of the group features, for example, in the form of one or more graph representations. As a result, respective group feature representations (e.g., graph representations) of candidate marker groups (e.g., groups 102a of FIG. 1A and 102b of FIG. 1B) may be obtained, for example, in the form of marker group features graphs with graph representations of the groups (e.g., graphs 404a and 404b of FIG. 4). The marker group features graphs may then be provided to a GNN (e.g., GNN 402 of FIG. 4) so that they may be compared to each other in order to determine any similarities that may be used to match the groups (e.g., based on first marker group features associated with the first group of candidate markers and second marker group features associated with the second group of candidate markers), as explained more fully below with respect to FIG. 4. For example, the candidate markers may include a first group of candidate markers detected in a first medical image (e.g., group 102a of FIG. 1A) and a second set of candidate markers detected in a second medical image (e.g., group 102b of FIG. 1B). In order to determine the graph representation of the candidate marker groups (e.g., marker group features graphs), the first group of candidate markers and the second group of candidate markers may be represented with the nodes of the graph representation and paired with each other. The respective relationships (e.g., based on the extracted group features) between the paired candidate markers may then be represented by the edges joining them in the graph representation. The group features extracted by the second CNN 302 for each of the edges of the graph representation may indicate a similarity or a dissimilarity between the paired candidate markers joined by each of the edges (e.g., do they belong to the same group).

Figure 4:
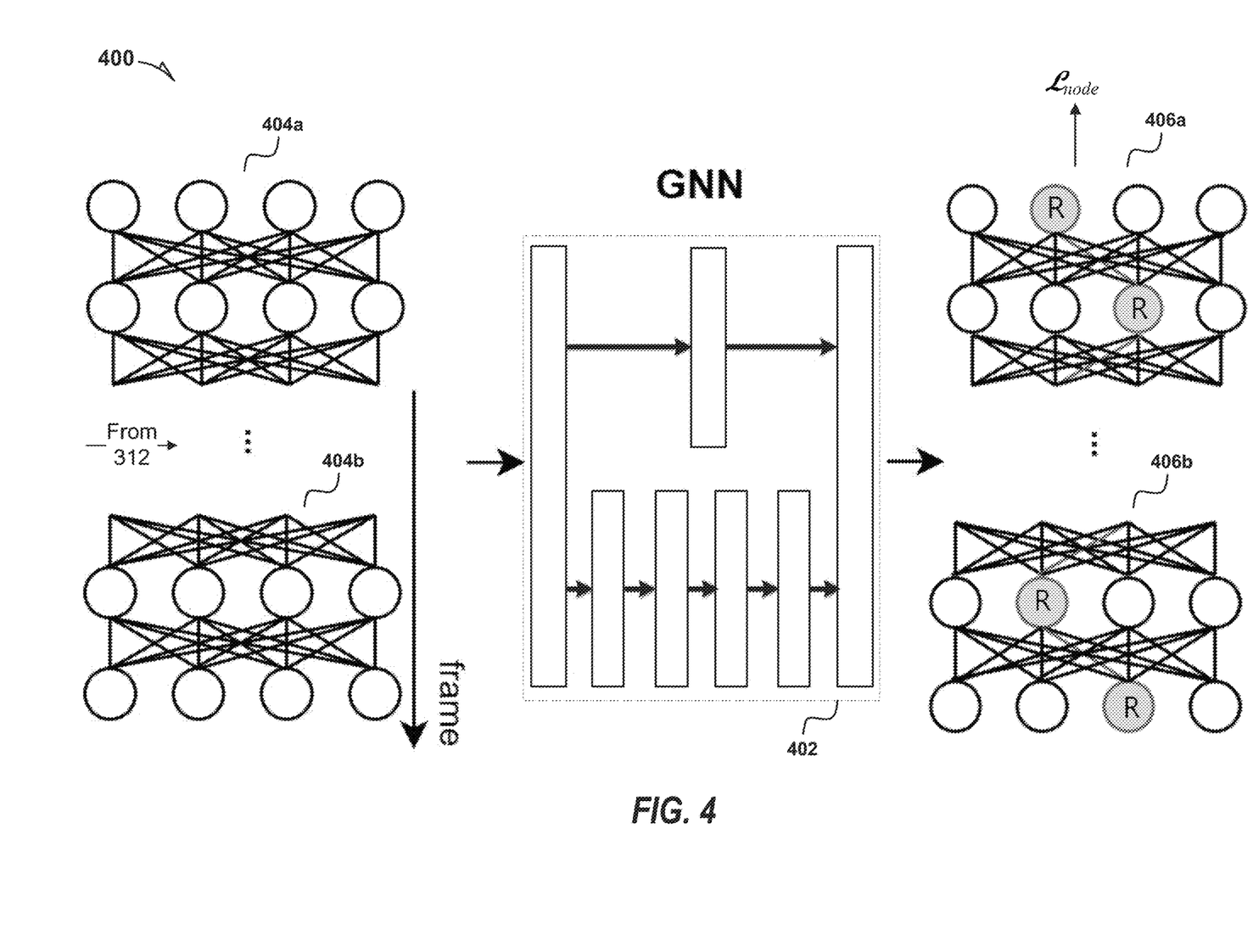
FIG. 4 is a simplified diagram illustrating example operations that may be performed to match a first group of candidate objects (e.g., markers) in a first medical image and a second group of candidate objects in a second medical image in accordance with one or more embodiments described herein.

FIG. 4 is a simplified diagram illustrating example operations 400 that may be performed to match a first group of candidate markers in a first medical image (e.g., group 102a of FIG. 1A) and a second group of candidate markers in a second medical image (e.g., group 102b of FIG. 1B) in accordance with one or more embodiments described herein. An apparatus configured to perform example matching operations 400 may include one or more processors configured to match the groups of candidate markers in separate medical images using a graphical neural network (GNN) 402. The GNN 402 has been trained to determine (e.g., label) which candidate markers (e.g., detected by the first CNN 204 of FIG. 2) are real markers and which are false markers. From the true candidate markers, the GNN 402 may further determine which pairs of candidate markers belong to a same group based on shared group features extracted from the corresponding region 208 that surrounds the group (e.g., are both indicators for a same stent present in the sequence of medical images 202).

The GNN 402 may receive marker group features graphs with representations of the groups (e.g., graphs 404a and 404b) from 312 of extraction operations 300 of FIG. 3 as described above. As noted above, an edge of these graphs may represent, for example, a relationship between a candidate marker group (e.g., group 102a) in a first medical image (FIG. 1A) and a possible matching candidate marker group (e.g., a group 102b that may comprise the same candidate markers) in a second medical image (FIG. 1B). By representing the geometric and/or spatial characteristics of the groups of candidate markers (e.g., group features extracted by second CNN 302 of FIG. 3) across multiple different medical images with the nodes and edges of the marker group features graphs (e.g., graphs 404a and 404b), the problem of tracking groups of candidate markers across multiple different medical images may be converted into a problem of graph node labeling and solved using GNN 402.

For example, the nodes of graph representation 404a may correspond to data structures storing information about candidate marker groups 102a, 104a, 102b and 104b, respectively, and the edges of graph representation 404a may correspond to data structures storing information about the respective relationships between candidate marker groups 102a and 102b and between candidate marker groups 104a and 104b. The nodes and edges of graph representations 404a and 404b may have their own features. By extracting and tracking these graph features, real markers (e.g., corresponding nodes labeled with "R" in graph outputs 406a and 406b) may be distinguished from false markers by the GNN 402.

In examples, the graph features of each edge in graph representation 404a may be derived based on geometric constraints associated with the two nodes connected by the edge. For example, an edge connecting the pair of real markers of group 102a of FIG. 1A may represent the distance between the pair of candidate markers and if the edge representing the relationship between the pair of candidate markers of group 102b of FIG. 1B represents a similar distance then the two groups (e.g., 102a and 102b) may be matched based on the geometric characteristics of these real markers being sustained between the multiple medical image frames (e.g., FIG. 1A and FIG. 1B) in the sequence of medical images 202. Therefore the values for the graph edges in graph output 406a (e.g., first and second graph features related to the first and second groups respectively) may indicate if two groups of candidate markers 102a and 102b in two separate medical images FIG. 1A and FIG. 1B are the same group of candidate markers. In examples, a node classification loss $\mathcal{L}_{node}$ may be calculated for the graph outputs (e.g., 406a) and used in training the GNN 402 or jointly training with other neural networks as described more fully below with respect to FIG. 6. In examples, the output of the first CNN 204 (e.g., pixel values for heatmaps 206 of the medical images 202) may be updated based on the output of the GNN 402 (e.g., node labels and edge values of graph output 406a).

The matching operations 400 may further obtain a subsequent medical image after the sequence of medical images 202 and calculate locations for a group of candidate markers (e.g., group 102a of FIG. 1A) in the subsequent medical image based on the locations of the group of candidate markers in the sequence of medical images 202. In examples, the GNN 402 described herein may be trained to estimate the respective states of the nodes and edges of the graph representation of the subsequent image in the sequence of medical images 202 through an iterative process that may include determining a current state of a node of the graph representation based on a previous state of the node and an average state of one or more edges of the graph representation that are associated with the node, and determining a current state of an edge of the graph representation based on a previous state of the edge and respective current states of one or more nodes of the graph representation that are associated with the edge.

Figure 5:
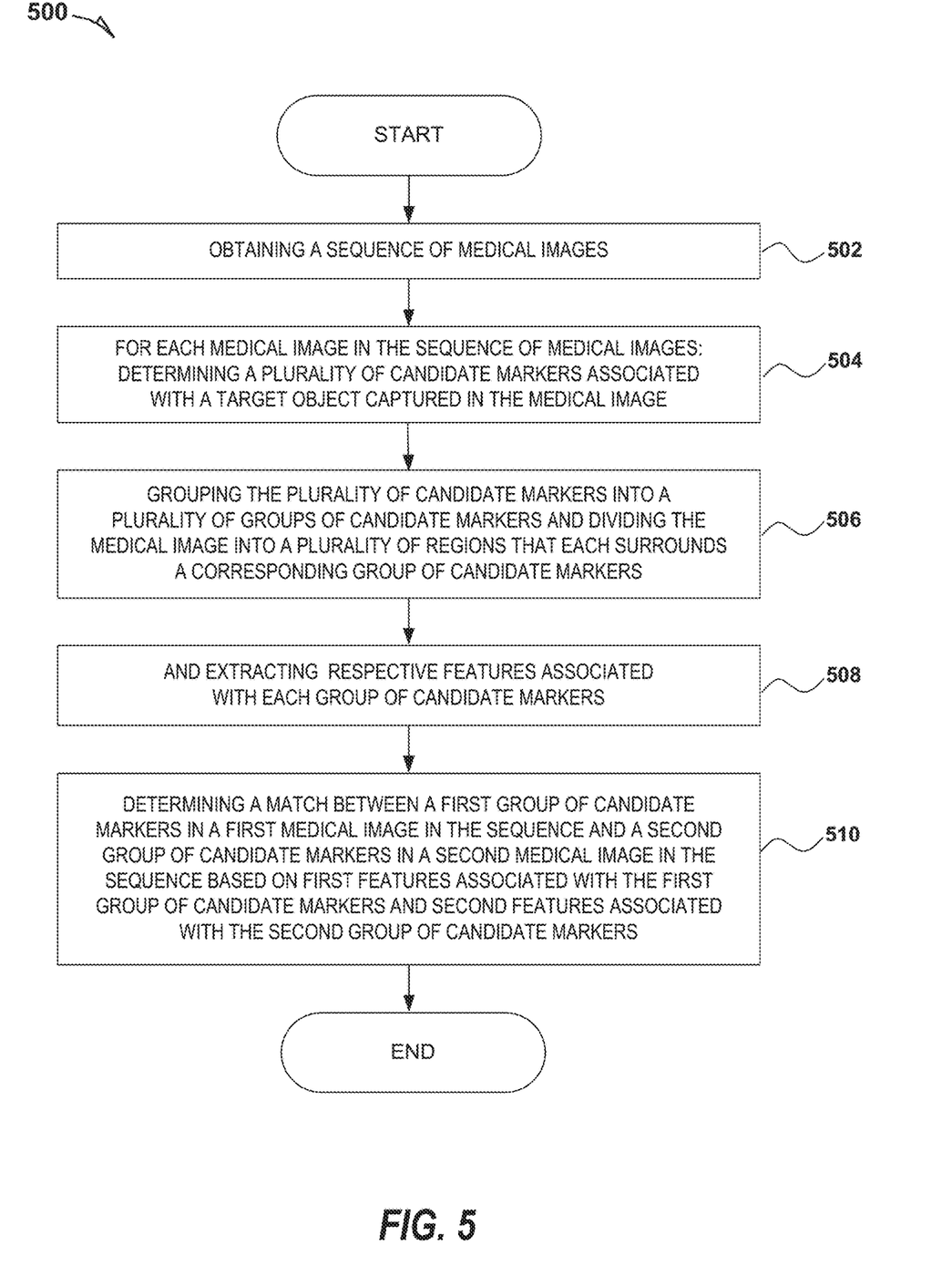
FIG. 5 is a simplified flow diagram illustrating example operations that may be performed for tracking groups of candidate objects (e.g., markers) across multiple medical images in accordance with one or more embodiments described herein.

FIG. 5 is a simplified flow diagram illustrating example operations 500 that may be performed for tracking groups of candidate markers across multiple medical images (e.g., 202 of FIG. 2) in accordance with one or more embodiments described herein. At operation 502, an apparatus configured to perform the target object detection task may include one or more processors configured to receive a medical images (e.g., a sequence of medical images 202 of the same anatomical structure). At operation 504, using one or more artificial neural networks (e.g., first CNN 204, second CNN 302 and GNN 402), a candidate markers associated with a target object (e.g., a group of balloon markers associated with a stent placed inside the anatomical structure) may be determined in each one of the sequence of medical images of the anatomical structure. At operation 506, the candidate markers may be grouped into a groups of candidate markers (e.g., groups 102a, 104a, 102b and 104b) and each medical image (e.g., FIG. 1A) in the sequence of medical images may be divided into a regions (e.g., 208) that each surrounds a corresponding group of candidate markers. At operation 508, respective features (e.g., marker group feature graph 404a) associated with each of the groups of candidate markers may then be extracted (e.g., from the corresponding regions 208). At operation 510, a match between a first group of candidate markers (e.g., 102a) in the first medical image (FIG. 1A) and a second group of candidate markers (e.g., 102b) in the second medical image (FIG. 1B) in the sequence may then be determined based on first features associated with the first group of candidate markers and second features associated with the second group of candidate markers (e.g., first and second graph features based on node labels/edge values from GNN 402 output graph 406a).

Figure 6:
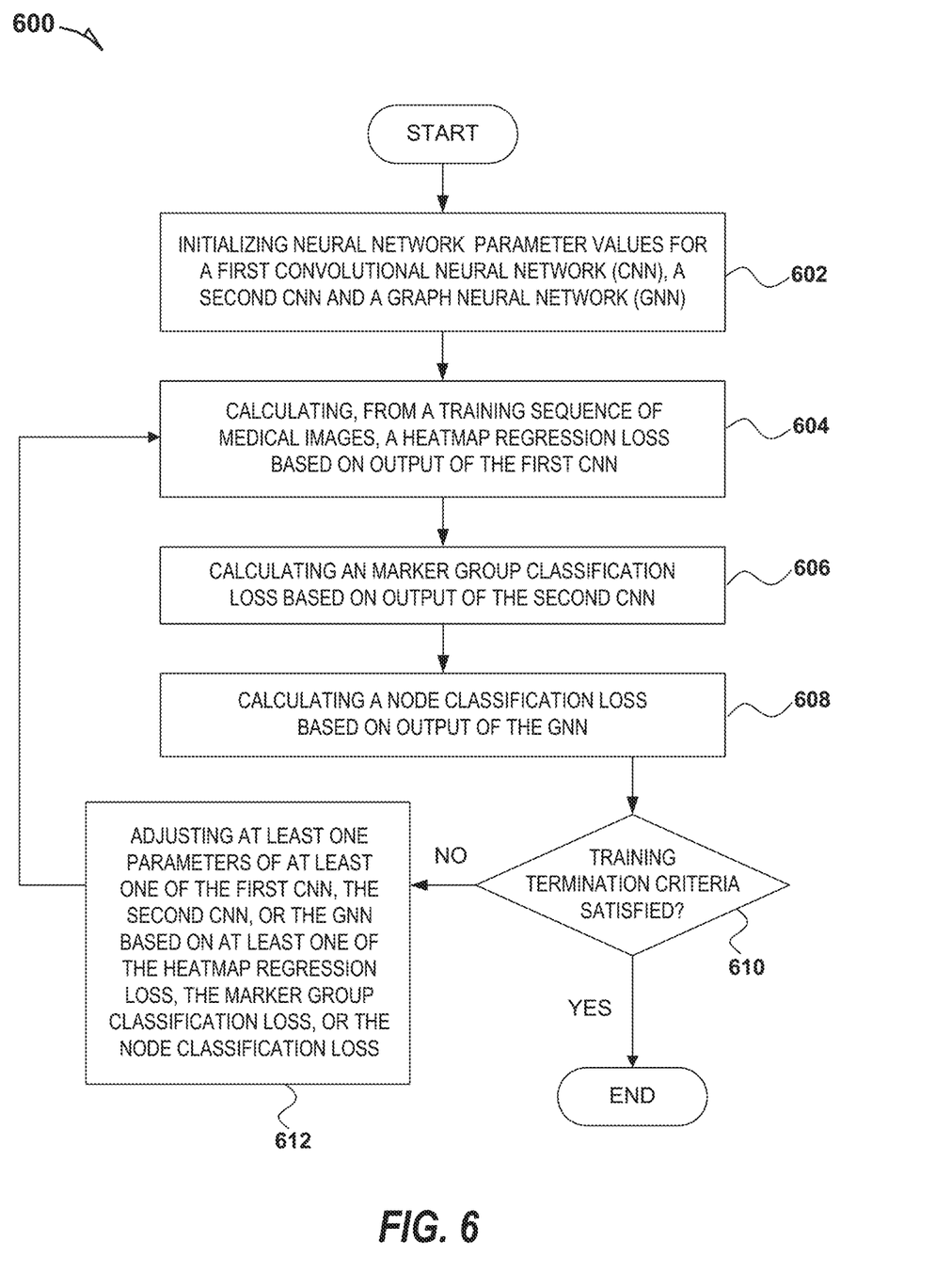
FIG. 6 is a simplified flow diagram illustrating example operations that may be performed for jointly training several neural networks in accordance with one or more embodiments described herein.

FIG. 6 is a simplified flow diagram illustrating example operations 600 that may be performed for jointly training several neural networks (e.g., first CNN 204, second CNN 302 and GNN 402) in accordance with one or more embodiments described herein. As shown, the training operations may include initializing the parameters of the neural network (e.g., weights associated with the various filters or kernels of the neural network) at 602. The parameters may be initialized, for example, based on samples collected from one or more probability distributions or parameter values of another neural network having a similar architecture. At operation 604, the training may further include providing training data (e.g., medical scan images comprising candidate markers to be detected) to the first CNN 204, and calculating a heatmap regression loss $\mathcal{L}_{hm}$ based on the output of the first CNN 204 (e.g., causing the first CNN 204 to predict a result and comparing the result with a ground truth to determine a loss associated with the prediction). At operation 606, the training may further include calculating a marker group classification loss $\mathcal{L}_{mark}$ based on the output of the second CNN 302 (e.g., marker group prediction output of first CNN 204 is the input). At operation 608, the training may further include calculating a node classification loss $\mathcal{L}_{node}$ based on the output of the GNN 402 (e.g., group feature graph output of second CNN 302 is the input). Once determined, the losses (e.g., $\mathcal{L}_{hm}$, $\mathcal{L}_{mark}$ and $\mathcal{L}_{node}$) may be evaluated at 610 to determine whether one or more training termination criteria have been satisfied. For example, a training termination criterion may be deemed satisfied if one or more of the loss(es) described above are below predetermined threshold values, if a change in one or more of the loss(es) between two training iterations (e.g., between consecutive training iterations) fall below predetermined threshold values, etc. If the determination at 610 is that a training termination criterion has been satisfied, the training may end. Otherwise, at least one parameters of at least one of the first CNN, the second CNN, or the GNN may be adjusted based on at least one of the heatmap regression loss $\mathcal{L}_{hm}$, the marker group classification loss $\mathcal{L}_{mark}$, or the node classification loss $\mathcal{L}_{node}$ at 612 before the training returns to operation 604.

For simplicity of explanation, the training steps are depicted and described herein with a specific order. It should be appreciated, however, that the training operations may occur in various orders, concurrently, and/or with other operations not presented or described herein. Furthermore, it should be noted that not all operations that may be included in the training process are depicted and described herein, and not all illustrated operations are required to be performed.

Figure 7:
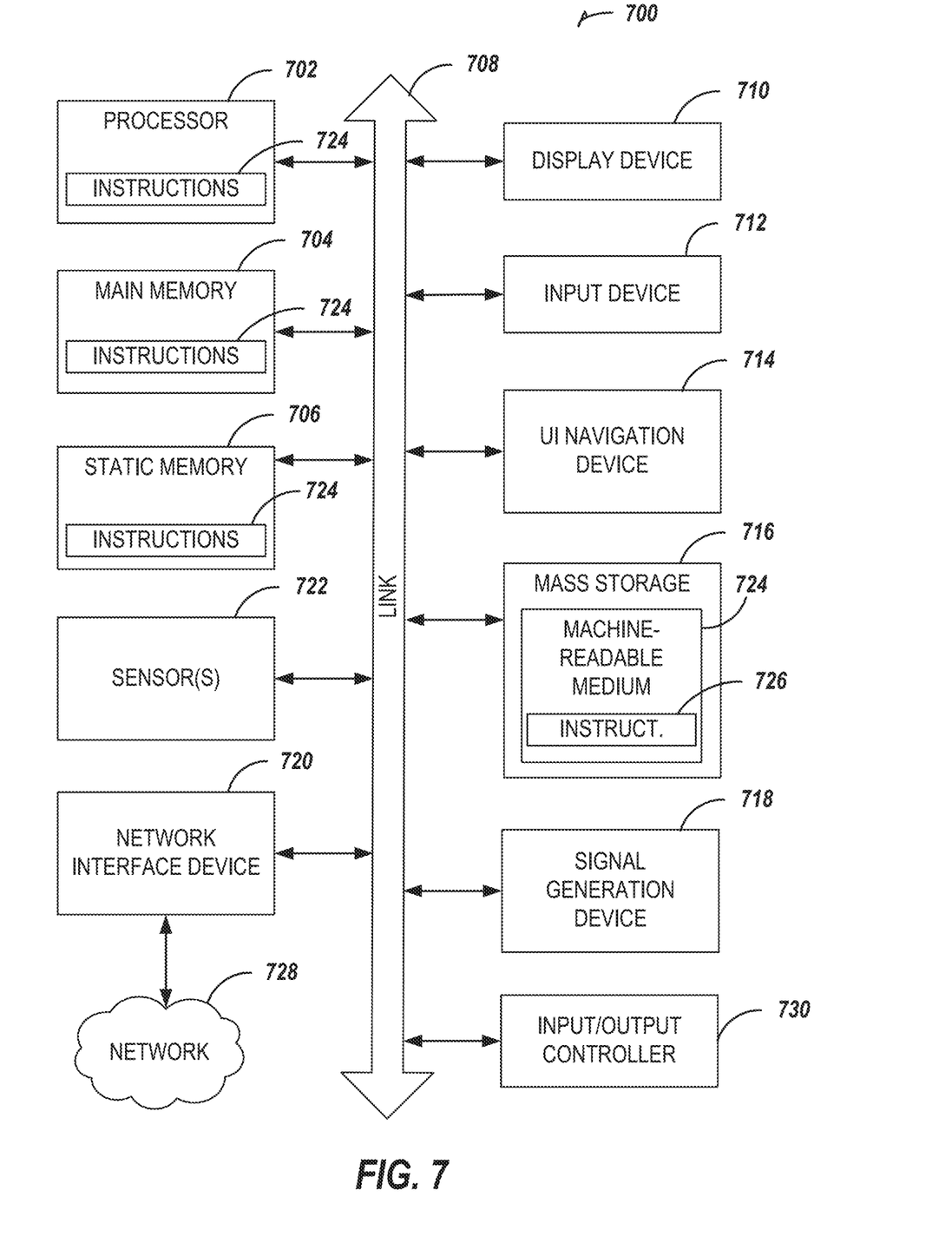
FIG. 7 is a simplified block diagram illustrating example components of an apparatus that may be configured to perform the tasks for tracking groups of candidate objects (e.g., markers) in accordance with one or more embodiments described herein.

FIG. 7 is a simplified block diagram illustrating example components of an apparatus 700 that may be configured to perform the tasks for tracking groups of candidate markers in accordance with one or more embodiments described herein. In embodiments, neural network system 700 may be connected (e.g., via a network, such as a Local Area Network (LAN), an intranet, an extranet, or the Internet) to other computer systems. Neural network system 700 may operate in the capacity of a server or a client computer in a client-server environment, or as a peer computer in a peer-to-peer or distributed network environment. Neural network system 700 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

Furthermore, the neural network system 700 may include a processing device 702, a volatile memory 704 (e.g., random access memory (RAM)), a non-volatile memory 706 (e.g., read-only memory (ROM) or electrically-erasable programmable ROM (EEPROM)), and a data storage device 716, which may communicate with each other via a bus 708. Processing device 702 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Neural network system 700 may further include a network interface device 722, a video display unit 710 (e.g., an LCD), an alphanumeric input device 712 (e.g., a keyboard), a cursor control device 714 (e.g., a mouse), a data storage device 716, and/or a signal generation device 720. Data storage device 716 may include a non-transitory computer-readable storage medium 724 on which may store instructions 726 encoding any one or more of the image processing methods or functions described herein. Instructions 726 may also reside, completely or partially, within volatile memory 704 and/or within processing device 702 during execution thereof by computer system 700, hence, volatile memory 704 and processing device 702 may also be machine-readable storage media.

While computer-readable storage medium 724 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

While this disclosure has been described in terms of certain embodiments and generally associated methods, alterations and permutations of the embodiments and methods will be apparent to those skilled in the art. Accordingly, the above description of example embodiments does not constrain this disclosure. Other changes, substitutions, and alterations are also possible without departing from the spirit and scope of this disclosure. In addition, unless specifically stated otherwise, discussions utilizing terms such as "analyzing," "determining," "enabling," "identifying," "modifying" or the like, refer to the actions and processes of a computer system, or similar electronic computing device, that manipulates and transforms data represented as physical (e.g., electronic) quantities within the computer system's registers and memories into other data represented as physical quantities within the computer system memories or other such information storage, transmission or display devices.

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

The invention claimed is:

1. An apparatus, comprising:
a memory and one or more processors, wherein the one or more processors are configured to:
obtain at least a first medical image and a second medical image;
for each of the first medical image and the second medical image:
determine, using a first neural network, a plurality of candidate objects in the medical image, wherein the first neural network is used to predict the probability of each pixel of the medical image belonging to at least one of the plurality of candidate objects and determine respective locations of the plurality of candidate objects in the medical image based on the predicted probability;
group the plurality of candidate objects into at least a first group of two or more candidate objects and a second group of two or more candidate objects;
extract first features from a first region of the medical image that includes the first group of two or more candidate objects; and
extract second features from a second region of the medical image that includes the second group of two or more candidate objects;
determine, using a graphical neural network (GNN), a match between the first group of two or more candidate objects in the first medical image and the first group of two or more candidate objects in the second medical image based on the first features respectively extracted from the first medical image and the second medical image; and
further determine, using the GNN, a match between the second group of two or more candidate objects in the first medical image and the second group of two or more candidate objects in the second medical image based on the second features respectively extracted from the first medical image and the second medical image;
wherein the GNN is configured to generate a graph representation that includes a first node, a second node, and an edge between the first node and the second node, the first node representing the first group of two or more candidate objects in the first medical image, the second node representing the first group of two or more candidate objects in the second medical image, and the edge representing a relationship between the first group of two or more candidate objects in the first medical image and the first group of two or more candidate objects in the second medical image;
wherein the GNN is further configured to calculate, based at least on the probability predicted by the first neural network for each pixel of the first medical image and the second medical image, a first node label for the first node and a second node label for the second node, the first node label indicating whether the first group of two or more candidate objects in the first medical image corresponds to real objects, and the second node label indicating whether the first group of two or more candidate objects in the second medical image corresponds to real objects; and
wherein the GNN is further configured to calculate an edge value for the edge between the first node and the second node, the edge value indicating whether the first group of two or more candidate objects in the first medical image and the first group of two or more candidate objects in the second medical image are associated with a same group of candidate objects.

2. The apparatus of claim 1, wherein the one or more processors are configured to represent the probability predicted by the first neural network for each pixel of the first medical image or the second medical image as a heatmap.

3. The apparatus of claim 1, wherein the plurality of candidate objects are candidate medical device markers, the first group of two or more candidate objects includes two or more candidate markers for a first medical device, and the second group of two or more candidate objects includes two or more candidate markers for a second medical device.

4. The apparatus of claim 1, wherein the one or more processors are configured to extract the first features and the second features using a second neural network.

5. The apparatus of claim 4, wherein the first neural network is pre-trained for identifying individual candidate objects in the first or second medical image, and wherein the second neural network is pre-trained for identifying groups of two or more candidate objects in the first or second medical image.

6. The apparatus of claim 1, wherein the one or more processors are configured to extract the first features and the second features using a second neural network, wherein the first neural network, the second neural network, and the GNN are jointly trained, and wherein the training comprises:
calculating, from a training sequence of medical images, a regression loss based on an output of the first neural network;
calculating a group classification loss based on an output of the second neural network;
calculating a node classification loss based on an output of the GNN; and
adjusting at least one parameter of at least one of the first neural network, the second neural network, or the GNN based on at least one of the regression loss, the group classification loss, or the node classification loss.

7. The apparatus of claim 1, wherein the GNN is configured to determine the first node label based further on the first features extracted from the first medical image, the GNN further configured to determine the second node label based further on the first features extracted from the second medical image.

8. The apparatus of claim 1, wherein the one or more processors are further configured to:
obtain a third medical image; and
determine respective locations of the plurality of candidate objects in the third medical image based on the respective locations of the plurality of candidate objects in the first medical image and the second medical image.

9. A method for tracking groups of candidate objects, comprising:
obtaining at least a first medical image and a second medical image;
for each of the first medical image and the second medical image:

determining, using a first neural network, a plurality of candidate objects in the medical image, wherein the first neural network is used to predict the probability of each pixel of the medical image belonging to at least one of the plurality of candidate objects and determine respective locations of the plurality of candidate objects in the medical image based on the predicted probability;

grouping the plurality of candidate objects into at least a first group of two or more candidate objects and a second group of two or more candidate objects;

extracting first features from a first region of the medical image that corresponds to the first group of two or more candidate objects; and extracting second features from a second region of the medical image that corresponds to the second group of two or more candidate objects;

determining, using a graphical neural network (GNN), a match between the first group of two or more candidate objects in the first medical image and the first group of two or more candidate objects in the second medical image based on the first features respectively extracted from the first medical image and the second medical image; and further determining, using the GNN, a match between the second group of two or more candidate objects in the first medical image and the second group of two or more candidate objects in the second medical image based on the second features respectively extracted from the first medical image and the second medical image;

wherein the GNN is configured to generate a graph representation that includes a first node, a second node, and an edge between the first node and the second node, the first node representing the first group of two or more candidate objects in the first medical image, the second node representing the first group of two or more candidate objects in the second medical image, and the edge representing a relationship between the first group of two or more candidate objects in the first medical image and the first group of two or more candidate objects in the second medical image;

wherein the GNN is further configured to calculate, based at least on the probability predicted by the first neural network for each pixel of the first medical image and the second medical image, a first node label for the first node and a second node label for the second node, the first node label indicating whether the first group of two or more candidate objects in the first medical image corresponds to real objects, and the second node label indicating whether the first group of two or more candidate objects in the second medical image corresponds to real objects; and wherein the GNN is further configured to calculate an edge value for the edge between the first node and the second node, the edge value indicating whether the first group of two or more candidate objects in the first medical image and the first group of two or more candidate objects in the second medical image are associated with a same group of candidate objects.

10. The method of claim 9, wherein the probability predicted by the first neural network for each pixel of the first medical image or the second medical image is represented by a heatmap.

11. The method of claim 9, wherein the plurality of candidate objects are candidate medical device markers, the first group of two or more candidate objects includes two or more candidate markers for a first medical device, and the second group of two or more candidate objects includes two or more candidate markers for a second medical device.

12. The method of claim 9, wherein the first features and the second features are extracted using a second neural network.

13. The method of claim 12, wherein the first neural network is pre-trained for identifying individual candidate objects in the first or second medical image, and wherein the second neural network is pre-trained for identifying groups of two or more candidate objects in the first or second medical image.

14. The method of claim 9, wherein the first features and the second features are extracted using a second neural network, wherein the first neural network, the second neural network, and the GNN are jointly trained, and wherein the training comprises:

calculating, from a training sequence of medical images, a regression loss based on an output of the first neural network;

calculating a group classification loss based on an output of the second neural network;

calculating a node classification loss based on an output of the GNN; and adjusting at least one parameter of at least one of the first neural network, the second neural network, or the GNN based on at least one of the regression loss, the group classification loss, or the node classification loss.

15. The method of claim 9, wherein the GNN is configured to determine the first node label based further on the first features extracted from the first medical image, the GNN further configured to determine the second node label based further on the first features extracted from the second medical image.

16. The method of claim 9, further comprising:
obtaining a third medical image; and
determining respective locations of the plurality of candidate objects in the third medical image based on the respective locations of the plurality of candidate objects in the first medical image and the second medical image.

* * * * *